US012450556B2

(12) United States Patent
Rao Karikurve et al.

(10) Patent No.: US 12,450,556 B2
(45) Date of Patent: Oct. 21, 2025

(54) DELIVERY TIME ESTIMATION USING AN ATTRIBUTE-BASED PREDICTION OF A DIFFERENCE BETWEEN AN ARRIVAL TIME AND A DELIVERY TIME FOR A DELIVERY LOCATION

(71) Applicant: Maplebear Inc., San Francisco, CA (US)

(72) Inventors: Sharath Rao Karikurve, Berkeley, CA (US); Ramasubramanian Balasubramanian, Jersey City, NJ (US); Ashish Sinha, Jersey City, NJ (US)

(73) Assignee: Maplebear Inc., San Francisco, CA (US)

( * ) Notice: Subject to any disclaimer, the term of this patent is extended or adjusted under 35 U.S.C. 154(b) by 203 days.

(21) Appl. No.: 18/129,021

(22) Filed: Mar. 30, 2023

(65) Prior Publication Data

US 2024/0330846 A1    Oct. 3, 2024

(51) Int. Cl.
*G06Q 10/0835* (2023.01)
*G06Q 10/087* (2023.01)
(Continued)

(52) U.S. Cl.
CPC ..... *G06Q 10/08355* (2013.01); *G06Q 10/087* (2013.01); *G06Q 30/0203* (2013.01); *G06N 20/00* (2019.01)

(58) Field of Classification Search
None
See application file for complete search history.

(56) References Cited

U.S. PATENT DOCUMENTS 10,127,496 B1 * 11/2018 Fu ..................... G01C 21/3407
10,438,164 B1 * 10/2019 Xiong .................... G06F 18/25
(Continued)

FOREIGN PATENT DOCUMENTS

WO     WO-02075493 A2 *  9/2002   ............ G06Q 10/08
WO     WO-2016025926 A1 *  2/2016   ....... G06Q 10/08355

OTHER PUBLICATIONS

Jian et al "Real-Time Multi-Vehicle Truckload Pick-Up and Delivery Problems", Dec. 2002, Department of Industrial and Manufacturing Engineering New Jersey Institute of Technology, pp. 1-34 (Year: 2002).*

(Continued)

*Primary Examiner* — Romain Jeanty
(74) *Attorney, Agent, or Firm* — Fenwick & West LLP

(57) ABSTRACT

An online concierge system receives, from a client device associated with a user of the online concierge system, order data associated with an order placed with the online concierge system, in which the order data describes a delivery location for the order. The online concierge system receives information describing a set of attributes associated with the delivery location and accesses a machine learning model trained to predict a difference between an arrival time and a delivery time for the delivery location. The online concierge system applies the model to the set of attributes associated with the delivery location to predict the difference between the arrival time and the delivery time for the delivery location and determines an estimated delivery time for the order based at least in part on the predicted difference. The online concierge system sends the estimated delivery time for the order for display to the client device.

19 Claims, 5 Drawing Sheets

(51) Int. Cl.
*G06Q 30/0203* (2023.01)
*G06N 20/00* (2019.01)

(56) References Cited

U.S. PATENT DOCUMENTS

| | | | | |
|---|---|---|---|---|
| 10,600,102 | B2* | 3/2020 | Haubold | H04L 67/52 |
| 10,922,778 | B2* | 2/2021 | Sun | G06N 3/08 |
| 11,126,953 | B2* | 9/2021 | Smith | G06Q 30/0601 |
| 11,270,372 | B2* | 3/2022 | Kumar | G06Q 30/0635 |
| 11,341,554 | B1* | 5/2022 | Sturm | G06Q 30/0235 |
| 11,551,182 | B2* | 1/2023 | Newell | G06N 20/00 |
| 11,783,406 | B1* | 10/2023 | Hsiao | H04L 63/102 |
| | | | | 705/26.61 |
| 2012/0233035 | A1* | 9/2012 | Wilgus | G06Q 30/02 |
| | | | | 705/27.1 |
| 2015/0120598 | A1* | 4/2015 | Fadell | G06Q 10/083 |
| | | | | 705/333 |
| 2016/0033289 | A1* | 2/2016 | Tuukkanen | G01C 21/3415 |
| | | | | 701/537 |
| 2016/0247113 | A1* | 8/2016 | Rademaker | G06Q 30/0635 |
| 2018/0060778 | A1* | 3/2018 | Guo | G01C 21/3667 |
| 2018/0174445 | A1* | 6/2018 | Rolf | G08G 1/0141 |
| 2018/0209808 | A1* | 7/2018 | Wang | G06F 18/214 |
| 2018/0259345 | A1* | 9/2018 | Wang | H04W 4/029 |
| 2018/0357736 | A1* | 12/2018 | Sun | G01C 21/38 |
| 2019/0107404 | A1* | 4/2019 | Zhong | G06Q 30/0284 |
| 2019/0259232 | A1* | 8/2019 | Nandakumar | G07C 9/00896 |
| 2020/0043077 | A1* | 2/2020 | Turner | G06Q 30/0641 |
| 2020/0118071 | A1* | 4/2020 | Venkatesan | G06N 20/00 |
| 2021/0264275 | A1 | 8/2021 | Han et al. | |
| 2022/0044198 | A1* | 2/2022 | Meister | G06Q 10/0833 |
| 2022/0237556 | A1* | 7/2022 | Schneider | G06Q 10/0838 |
| 2023/0078450 | A1* | 3/2023 | Ruan | G06Q 30/0202 |
| | | | | 705/7.31 |

OTHER PUBLICATIONS

AdTheorent "AdTheorent Unveils Suite of Machine Learning Solutions for Restaurant and Dining Brands", Oct. 2019, AdTheorent, pp. 1-5. (Year: 2019).*
PCT International Search Report and Written Opinion, PCT Application No. PCT/US24/20589, Jul. 12, 2024, 19 pages.

* cited by examiner

DELIVERY TIME ESTIMATION USING AN ATTRIBUTE-BASED PREDICTION OF A DIFFERENCE BETWEEN AN ARRIVAL TIME AND A DELIVERY TIME FOR A DELIVERY LOCATION

BACKGROUND

Online concierge systems allow customers to place online delivery orders and select delivery timeframes during which the orders are to be delivered. The orders are then matched with pickers who service the orders. Pickers may service orders by performing different tasks involved in servicing the orders, such as driving to retailer locations, collecting items included in the orders, purchasing the items, and delivering the items to customers. As the tasks involved in servicing the orders are completed, online concierge systems may provide updates to their customers based on real-time information, including estimated delivery times for the orders.

Pickers often rely on details about delivery locations provided by customers to deliver orders efficiently and to determine whether to accept the orders for servicing in the first place. For example, when servicing an order to be delivered to a gated community, a picker may be required to enter an access code provided by a customer to reach the delivery location. In this example, if the delivery location is on an upper floor of a multi-story apartment complex, the order may be delivered more efficiently if the picker follows instructions provided by the customer to use an elevator rather than stairs. In the above example, pickers who prefer to service orders with more straightforward deliveries (e.g., to detached single-family homes in non-gated communities) may not accept the order for servicing.

However, customers may forget to provide details about delivery locations for their orders, making it more difficult and time-consuming for pickers to deliver the orders and estimated delivery times less accurate. For example, if a picker is unaware that a delivery location for an order is within a gated community, they may spend a significant amount of time trying to figure out how to enter the community, trying to reach a customer associated with the order, speaking or chatting with the customer about how to enter the community or where to meet them, etc. As an additional example, if a delivery location is on the upper floor of a multi-story building and a picker delivering an order to the delivery location is unaware that the building has an elevator, the picker may spend much more time and effort than they anticipated climbing up multiple flights of stairs to deliver the order, especially if the order includes heavy or bulky items. Due to this lack of details about delivery locations, pickers may spend significantly more time than they anticipated delivering orders, which may result in actual delivery times that are much later than the estimated delivery times and negative experiences for both pickers and customers.

SUMMARY

In accordance with one or more aspects of the disclosure, an online concierge system estimates a delivery time for an order placed with the online concierge system using an attribute-based prediction of a difference between an arrival time and a delivery time for a delivery location. More specifically, an online concierge system receives, from a client device associated with a user of the online concierge system, order data associated with an order placed with the online concierge system, in which the order data describes a delivery location for the order. The online concierge system also receives information describing a set of attributes associated with the delivery location and accesses a machine learning model trained to predict a difference between an arrival time and a delivery time for the delivery location. The online concierge system applies the machine learning model to the set of attributes associated with the delivery location to predict the difference between the arrival time and the delivery time for the delivery location and determines an estimated delivery time for the order based at least in part on the predicted difference. The online concierge system then sends the estimated delivery time for the order for display to the client device.

DETAILED DESCRIPTION

Figure 1:
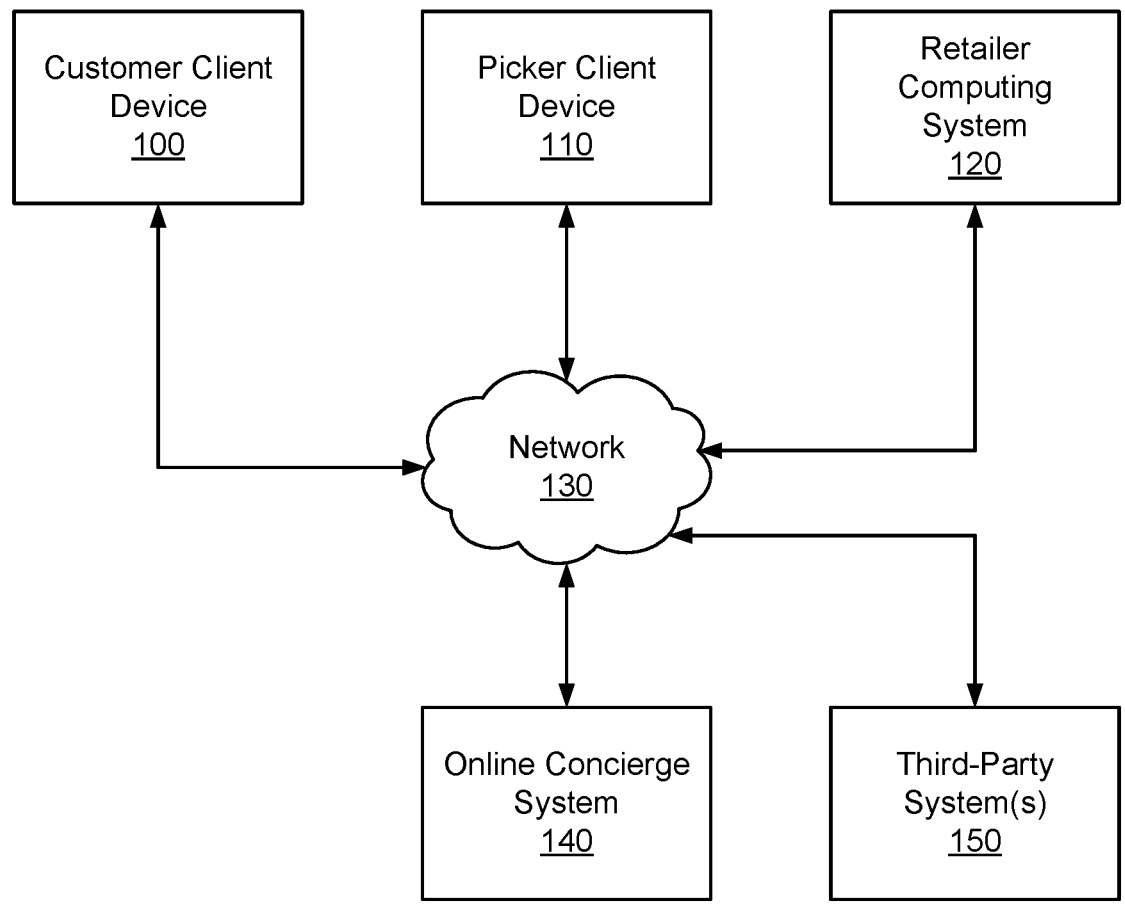
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, an online concierge system 140, and one or more third-party systems 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, the online concierge system 140, or the third-party system(s) 150. The customer client device 100 can be a personal or mobile computing device, such as a smartphone, a tablet, a laptop computer, or a desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, refers to a good or product that may be provided to the customer through the online concierge system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected. Furthermore, an order may include one or more instructions describing how the ordered items are to be collected from a retailer location or delivered to the delivery location (e.g., at a drop-off location). For example, an order may include instructions for a picker to leave items included in the order on their doorstep, to walk up three flights of stairs, or to call the customer when they arrive.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the items should be collected or delivered.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

A customer also may use a customer client device 100 to provide information describing a delivery location to the online concierge system 140. Information describing a delivery location may describe a type of the delivery location (e.g., office, residence, etc.), one or more buildings associated with the delivery location (e.g., single-unit, multi-unit, detached, semi-detached, attached, etc.), how the delivery location may be accessed (e.g., via a gate, an access code, a keypad/call box, a security desk, etc.), one or more parking spots associated with the delivery location, or any other suitable types of information. For example, suppose that a delivery location is a detached house within a guard-gated neighborhood. In this example, information describing the delivery location may indicate that the delivery location is a detached single-unit residence in a gated community that may be accessed by speaking to a guard. Information describing a delivery location may include various types of data (e.g., text data, image data, video data, audio data, etc.). In the above example, the information describing the delivery location may include a combination of text data (e.g., words or phrases indicating that the delivery location is a detached single-unit residence) and image data (e.g., an image of the guard-gated entrance to the neighborhood).

Information describing a delivery location provided by a customer client device 100 to the online concierge system 140 also may describe a set of attributes associated with the delivery location. In some embodiments, an attribute associated with a delivery location may affect delivery times for orders delivered to the delivery location. Examples of attributes associated with a delivery location include: characteristics of a building associated with the delivery location (e.g., dimensions, number of floors or units, whether it is attached or detached, numbers or locations of steps, elevators, gates, keypads/call boxes, security desks, etc.), one or more parking spots, a floor number, or an access code associated with the delivery location, or any other suitable attributes. For example, if a delivery location is a unit within a multi-building apartment complex, information describing the delivery location received from a customer client device 100 may indicate that the delivery location is a residential apartment complex and that access to the delivery location requires permission from a resident that may be requested via a call box. In this example, the information describing the delivery location further may describe locations of the unit, the call box, and one or more parking spots included in a parking lot associated with the delivery location.

Information describing a delivery location may be provided by a customer client device 100 to the online concierge system 140 in various circumstances. In some embodiments, information describing a delivery location may be provided to the online concierge system 140 by a customer client device 100 when a customer associated with the customer client device 100 creates an account with the online concierge system 140. For example, when a customer creates an account with the online concierge system 140, information describing a delivery location associated with the customer may be received from a customer client device 100 associated with the customer in the form of default delivery instructions (e.g., "leave the order at the security desk near the stairs"). In this example, the information describing the delivery location may describe a set of attributes associated with the delivery location corresponding to stairs and a security desk. In various embodiments, information describing a delivery location may be received from a customer client device 100 when a customer associated with the customer client device 100 places an order (e.g., via the ordering interface). In the above example, the instructions alternatively may be provided by the customer client device 100 when the customer places an order with the online concierge system 140. In some embodiments, information describing a delivery location also may be provided to the online concierge system 140 by a customer client device 100 in response to a prompt, a survey, a questionnaire, etc. associated with the delivery location sent to the customer client device 100 or in one or more messages sent by the customer client device 100 to a picker client device 110, as further described below.

The picker client device 110 is a client device through which a picker may interact with the customer client device 100, the retailer computing system 120, the online concierge system 140, or the third-party system(s) 150. The picker client device 110 can be a personal or mobile computing device, such as a smartphone, a tablet, a laptop computer, or a desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer location. The picker client device 110 presents the items that are included in the customer's order to the picker in a collection interface. The collection interface is a user interface that provides information to the picker identifying the items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. If a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

As a picker services orders, a picker client device 110 associated with the picker may communicate information to the online concierge system 140 indicating that the picker has arrived at a delivery location or that the picker has delivered an order to the delivery location. A picker may have arrived at a delivery location when they have parked their vehicle in a parking lot for the delivery location, when they have arrived at a gate at the delivery location, etc. A picker may have delivered an order once they have handed all items included in the order to a customer at a delivery location for the order, once they have dropped off the items at a drop-off location specified by the customer (e.g., the front door), etc. Information indicating that a picker has arrived at a delivery location or that the picker has delivered an order to the delivery location may be communicated to the online concierge system 140 in association with various types of information (e.g., a timestamp indicating when the picker arrived at the delivery location or when the order was delivered to the delivery location, an order number for the order, etc.).

A picker client device 110 may communicate information to the online concierge system 140 indicating that a picker associated with the picker client device 110 has arrived at a delivery location or that the picker has delivered an order to the delivery location based on various events. This may occur when a change in signal is detected by a sensor (e.g., an accelerometer, an altimeter, a gyroscope, a GPS sensor, a Bluetooth sensor, etc.) included in the picker client device 110, when the information is manually entered into the picker client device 110, when the picker client device 110 enters or exits a virtual boundary (e.g., a geofence) associated with the delivery location, or upon any other suitable event. For example, information indicating that a picker has arrived at a delivery location may be communicated to the online concierge system 140 by a picker client device 110 associated with the picker when the picker client device 110 loses Bluetooth connectivity with a vehicle and GPS coordinates associated with the picker client device 110 indicate that the picker client device 110 is within a threshold distance of the delivery location. As an additional example, information indicating that a picker has arrived at a delivery location or delivered an order to the delivery location may be communicated to the online concierge system 140 by a picker client device 110 associated with the picker when the information is manually entered into the picker client device 110. As yet another example, information indicating that a picker has arrived at a delivery location may be communicated to the online concierge system 140 by a picker client device 110 associated with the picker when the picker client device 110 enters a geofence associated with a building in which the delivery location is located.

Additionally, as a picker services orders, a picker client device 110 associated with the picker also may communicate information to the online concierge system 140 describing a delivery location. As described above, information describing a delivery location may describe a type of the delivery location, one or more buildings associated with the delivery location, a set of attributes associated with the delivery location, etc. and may include various types of data (e.g., text data, image data, video data, audio data, etc.). In some embodiments, information describing a delivery location may be provided to the online concierge system 140 by a picker client device 110 in response to a prompt, a survey, a questionnaire, etc. associated with the delivery location sent to the picker client device 110 or in one or more messages sent by the picker client device 110 to a customer client device 100, as further described below.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 may provide item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, the online concierge system 140, and the third-party system(s) 150 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

One or more third-party systems 150 may provide information describing a delivery location to the online concierge system 140. As described above, information describing a delivery location may describe a type of the delivery location, one or more buildings associated with the delivery location, a set of attributes associated with the delivery location, etc. and may include various types of data (e.g., text data, image data, video data, audio data, etc.). The third-party system(s) 150 may provide information describing a delivery location to the online concierge system 140 via one or more applications, websites, databases, etc. provided by or maintained by the third-party system(s) 150.

For example, a third-party system 150 that provides a mapping application may provide information describing a delivery location to the online concierge system 140, in which the information indicates that an address of the delivery location is associated with a single-unit building. As an additional example, a third-party system 150 that maintains a database of floorplans may provide information to the online concierge system 140 describing a delivery location, in which the information includes image data corresponding to a floorplan associated with the delivery location. In some embodiments, information describing a delivery location provided by a third-party system 150 may be publicly available. For example, a third-party system 150 that provides a public online directory service may provide information describing a delivery location, in which the information is stored in public databases or included among other types of public records. Information describing a delivery location may be provided to the online concierge system 140 by a third-party system 150 in association with various types of information (e.g., a timestamp indicating when it was provided or last updated, information identifying the third-party system 150, etc.).

Figure 2:
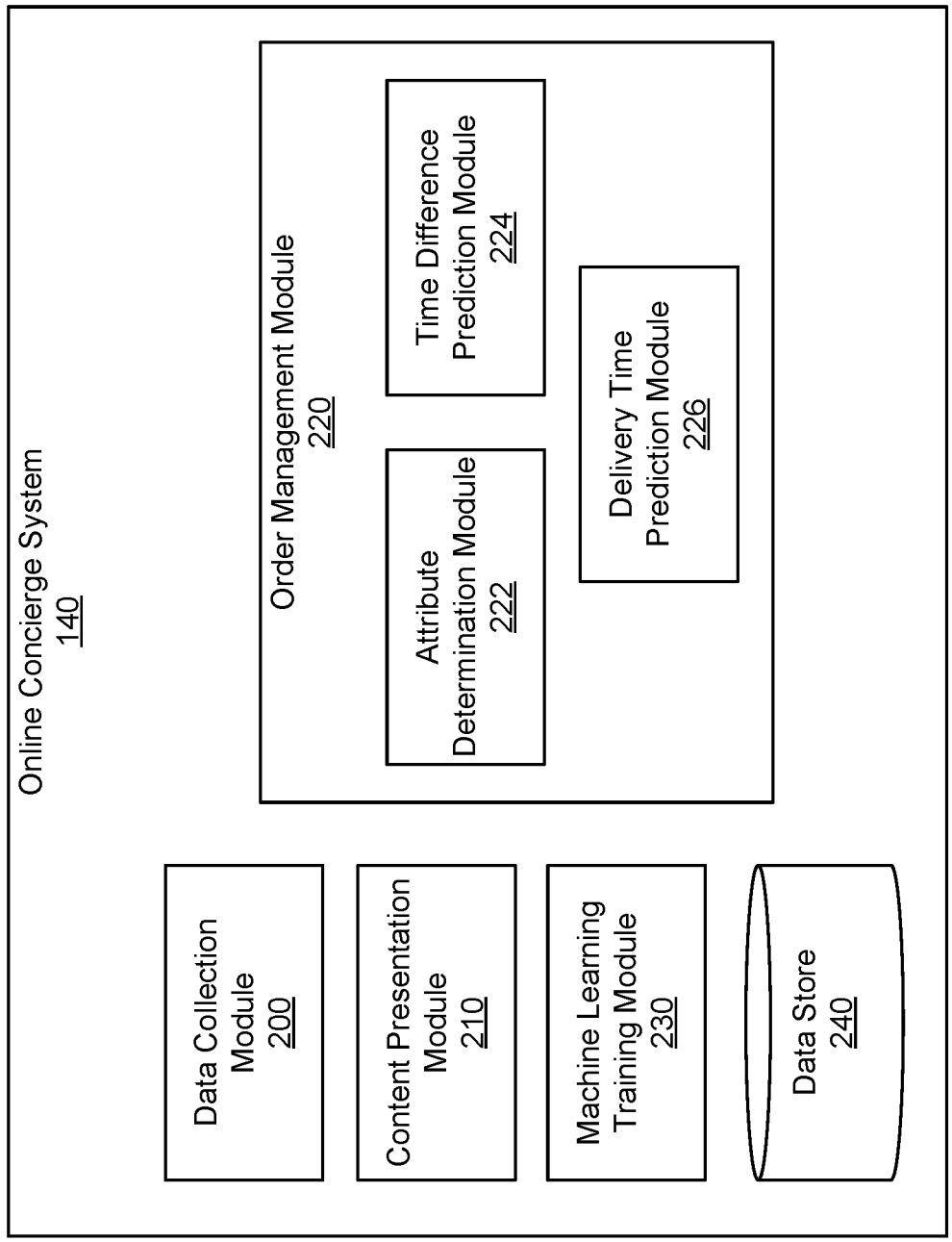
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

The data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, delivery instruction, or delivery timeframe. The data collection module 200 may collect the customer data from sensors on the customer client device 100 or based on the customer's interactions with the online concierge system 140.

The data collection module 200 also may collect information describing one or more delivery locations. As described above, information describing a delivery location may describe a type of the delivery location, one or more buildings associated with the delivery location, a set of attributes associated with the delivery location, etc. and may include various types of data (e.g., text data, image data, video data, audio data, etc.). The data collection module 200 may collect information describing a delivery location from one or more customer client devices 100, one or more picker client devices 110, or one or more third-party systems 150. In some embodiments, the data collection module 200 also may collect information describing a delivery location from the attribute determination module 222, which may determine one or more attributes associated with the delivery location, as further described below.

The data collection module 200 also collects item data, which is information or data that identifies and describes items that are available at a retailer location. The item data may include item identifiers for items that are available and may include quantities of items associated with each item identifier. Additionally, item data may also include attributes of items such as the sizes, colors, weights, stock keeping units (SKUs), or serial numbers for the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, the retailers from which the picker has collected items, or the picker's previous shopping history. Additionally, the picker data may include preferences expressed by the picker, such as their preferred retailers for collecting items, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. Order data may include information identifying an order (e.g., an order number), information associated with a retailer location from which items included in the order are to be collected (e.g., name, address, etc.), a number of items included in the order, item data for the items, a delivery location for the order (e.g., address), or a timeframe within which the order is to be delivered. Order data also may include information associated with a customer associated with an order (e.g., name, phone number, etc. associated with a customer who placed the order or a customer to whom the order is to be delivered), instructions associated with the order provided by the customer (e.g., how to collect or deliver the items), or any other suitable types of information. Order data may further include information describing how the order was serviced, such as which picker serviced the order, when the picker arrived at a delivery location for the order, when the order was delivered, or a rating that the customer gave the delivery of the order. For example, order data may include a timestamp indicating when a picker servicing an order arrived at a delivery location for the order and another timestamp indicating when the picker delivered the order. In some embodiments, order data also may include information describing messages sent between a customer associated with an order and a picker who serviced the order. For example, order data may include the content of each message between a picker client device 110 and a customer client device 100 and a timestamp associated with each message. In various embodiments, order data also may include information describing a delivery location for an order received from a customer associated with an order or a picker who serviced the order. For example, order data may include a response to a prompt, a survey, or a questionnaire associated with a delivery location sent to a picker client device 110 or a customer client device 100. The data collection module 200 may collect order data from the customer client device 100, the picker client device 110, or from the customer's or picker's interactions with the online concierge system 140.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. Components of the order management module 220 include an attribute determination module 222, a time difference prediction module 224, and a delivery time prediction module 226. The order management module 220 receives orders from customer client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

The attribute determination module 222 determines one or more attributes associated with a delivery location. As described above, in some embodiments, an attribute associated with a delivery location may affect delivery times for orders delivered to the delivery location. As also described above, examples of attributes associated with a delivery location include: characteristics of a building associated with the delivery location (e.g., dimensions, number of floors or units, whether it is attached or detached, numbers or locations of steps, elevators, gates, keypads/call boxes, security desks, etc.), one or more parking spots, a floor number, or an access code associated with the delivery location, etc. The attribute determination module 222 may determine one or more attributes associated with a delivery location based on information describing the delivery location received from one or more customer client devices 100, picker client devices 110, or third-party systems 150. For example, suppose that information describing a delivery location is received from a third-party system 150 that maintains a public database describing various neighborhoods. In this example, if the information indicates that the delivery location is in a gated residential neighborhood and that the neighborhood includes detached single-family houses, the attribute determination module 222 may determine that the delivery location is a detached single-unit building in a gated community.

Information describing a delivery location used by the attribute determination module 222 to determine one or more attributes associated with the delivery location may include various types of data (e.g., text data, image data, video data, audio data, etc.). In embodiments in which information describing a delivery location includes text data, the attribute determination module 222 may preprocess the text data (e.g., using one or more machine learning models, natural language processing (NLP) techniques, such as tokenization, normalization, etc., embeddings, etc.). For example, suppose that information describing a delivery location received from a picker client device 110 during a chat with a customer includes the following text: "I'm here. How do I get into the gate?" and that a response received from a customer client device 100 associated with the customer includes the following text: "Enter 1234 into the keypad." In this example, the attribute determination module 222 may preprocess the text and determine that the delivery location is associated with a gate and an access code of 1234. In some embodiments, the attribute determination module 222 also may preprocess text data describing a delivery location into a standardized set of instructions that may be stored in association with customer data for a customer associated with the delivery location or information describing the delivery location (e.g., in the data store 240). In the above example, the attribute determination module 222 may preprocess the text into a standardized set of instructions indicating that the delivery location requires the access code of 1234. In embodiments in which information describing a delivery location includes image or video data, the attribute determination module 222 may determine one or more attributes associated with the delivery location using object detection or other computer vision techniques. For example, based on image data corresponding to a street view of a delivery location, the attribute determination module 222 may use an object detection algorithm to identify a multi-story apartment building associated with the delivery location, as well as stairs and a gate associated with the delivery location.

In some embodiments, the attribute determination module 222 also may determine one or more attributes associated with a delivery location based on a set of features associated with the delivery location. In such embodiments, the set of features may be included among information describing the delivery location received from one or more customer client devices 100, picker client devices 110, or third-party systems 150. Features associated with a delivery location may include an address of the delivery location, a floorplan associated with the delivery location, one or more parking spots associated with the delivery location, a geographical location associated with the delivery location, or one or more buildings associated with the delivery location. Features associated with a delivery location also may include one or more dimensions of one or more buildings associated with the delivery location, one or more elevations associated with the delivery location, or any other suitable features. For example, based on a unit number (e.g., a suite number, an apartment number, etc.) included in an address of a delivery location received from a customer client device 100, the attribute determination module 222 may determine that the delivery location is in a multi-unit building. As an additional example, suppose that information describing a delivery location received from a third-party system 150 includes a floorplan that indicates that the delivery location is a single unit since it includes only one living room, kitchen, garage, and front door. In this example, if an image associated with the delivery location received from another third-party system 150 (e.g., a mapping application provider) indicates that a building associated with the delivery location is associated with only one address, the attribute determination module 222 may determine that the delivery location is in a detached single-unit building.

In some embodiments, the attribute determination module 222 may determine one or more attributes associated with a delivery location using one or more attribute prediction models that may be trained by the machine learning training module 230, as described below. An attribute prediction model is a machine learning model that is trained to predict a likelihood that an attribute is associated with a delivery location. For example, one attribute prediction model may be trained to predict a likelihood that a delivery location is gated, while another attribute prediction model may be trained to predict a likelihood that a delivery location has stairs. In embodiments in which the attribute determination module 222 determines one or more attributes associated with a delivery location using one or more attribute prediction models, the attribute determination module 222 may access the model(s) (e.g., from the data store 240). The attribute determination module 222 may then apply the model(s) to one or more features associated with the delivery location to predict one or more likelihoods that one or more attributes are associated with the delivery location. The attribute determination module 222 may then receive one or more outputs from the attribute prediction model(s) corresponding to the predicted likelihood(s) and the attribute determination module 222 may determine one or more attributes associated with the delivery location based on the predicted likelihood(s). For example, the attribute determination module 222 may apply an attribute prediction model to features of a delivery location, such as an address of the delivery location, a floorplan associated with the delivery location, one or more dimensions of one or more buildings associated with the delivery location, etc. In this example, the attribute determination module 222 may then receive an output from the attribute prediction model corresponding to a predicted likelihood that an attribute (e.g., stairs) is associated with the delivery location and determine that the attribute is associated with the delivery location if the predicted likelihood is at least a threshold likelihood.

The time difference prediction module 224 predicts a difference between an arrival time and a delivery time for a delivery location. A difference between an arrival time and a delivery time for a delivery location corresponds to a difference between a time that a picker arrives at the delivery location for an order and a time that the picker delivers the order to the delivery location. In some embodiments, the time difference prediction module 224 may predict a difference between an arrival time and a delivery time for a delivery location based on a set of attributes associated with the delivery location, attributes associated with delivery locations for previous orders, and differences between arrival times and delivery times for these delivery locations. For example, the time difference prediction module 224 may predict a difference between an arrival time and a delivery time for a delivery location based on differences between arrival times and delivery times for delivery locations associated with attributes that are similar to those associated with the delivery location. In some embodiments, the time difference prediction module 224 may predict a difference between an arrival time and a delivery time for a delivery location based on reliabilities of attributes associated with the delivery location (e.g., by weighing more reliable attributes more heavily than less reliable attributes). In such embodiments, a reliability of an attribute may be determined by the time difference prediction module 224 based on a set of rules indicating the reliability of the attribute (e.g., based on a source from which the attribute was received, a time that the attribute was received or updated, etc.), which may be stored in association with the attribute (e.g., in the data store 240), as further described below.

In various embodiments, the time difference prediction module 224 also may predict a difference between an arrival time and a delivery time for a delivery location based on attributes associated with an order, which may be included among order data associated with the order. Examples of attributes associated with an order include: a number of items included in the order, item data for items included in the order, a delivery location for the order, information identifying a customer associated with the order, information identifying a picker servicing the order, instructions associated with the order provided by the customer, or any other suitable types of attributes. For example, the time difference prediction module 224 may predict a greater difference between an arrival time and a delivery time for a delivery location if an order to be delivered to the delivery location includes a large number of heavy items than if the order includes a small number of light items.

In some embodiments, the time difference prediction module 224 predicts a difference between an arrival time and a delivery time for a delivery location using a time difference prediction model, which is a machine learning model (e.g., a regression model) that is trained to predict a difference between an arrival time and a delivery time for a delivery location. In various embodiments, the time difference prediction model may be trained by the machine learning training module 230, as described below. To use the time difference prediction model, the time difference prediction module 224 may access the model (e.g., from the data store 240) and apply the model to a set of attributes associated with a delivery location. In various embodiments, the time difference prediction module 224 also may apply the time difference prediction model to a set of attributes associated with an order to be delivered to the delivery location. The time difference prediction module 224 may then receive an output from the time difference prediction model corresponding to a predicted difference between an arrival time and a delivery time for the delivery location (e.g., in minutes or seconds). For example, the time difference prediction module 224 may access and apply the time difference prediction model to a set of attributes associated with a delivery location (e.g., one or more steps, elevators, floors, buildings, gates, keypads/call boxes, security desks, etc. associated with the delivery location, one or more parking spots and an access code associated with the delivery location, etc.). In this example, the time difference prediction module 224 also may apply the time difference prediction model to a set of attributes associated with an order to be delivered to the delivery location, such as information describing a number of items included in the order, a weight of each item included in the order, a size of each item included in the order, etc. Continuing with this example, the time difference prediction module 224 may then receive an output from the time difference prediction model corresponding to a predicted difference between an arrival time and a delivery time for the delivery location.

The order management module 220 may generate a request to fulfill an order. A request to fulfill an order may include order data associated with the order (e.g., a number of items included in the order, a retailer location from which the items are to be collected, a delivery location for the order, a delivery timeframe for the order, instructions provided by a customer associated with the order, etc.), a pay rate or a tip for servicing the order, or any other suitable types of information. In some embodiments, the order management module 220 may generate a request to fulfill an order based at least in part on a difference between an arrival time and a delivery time for a delivery location for the order predicted by the time difference prediction module 224, information describing the order or delivery location stored in the data store 240, or any other suitable data. For example, if a predicted difference between an arrival time and a delivery time for a delivery location for an order is at least a threshold difference, the order management module 220 may increase a pay rate for servicing the order or add a service fee in a request to fulfill the order. As an additional example, suppose that information describing a delivery location stored in the data store 240 describes a set of attributes associated with the delivery location (e.g., multiple steps, a gate, and an access code) and order data associated with an order to be delivered to the delivery location indicates the order includes several heavy items. In this example, the order management module 220 may generate a request to fulfill the order that includes information describing the set of attributes and items. Once generated, a request to fulfill an order may be sent to one or more picker client devices 110 associated with one or more pickers who may service the order.

The delivery time prediction module 226 determines an estimated delivery time for an order. The delivery time prediction module 226 may do so once a request to fulfill the order has been accepted by a picker. An estimated delivery time for an order may be determined based on estimated amounts of time it would take for a picker to perform tasks involved in servicing the order (e.g., to travel to a retailer location to collect one or more items included in the order, to collect the item(s), to purchase the item(s), to travel to a delivery location for the order, and to deliver the order). The delivery time prediction module 226 may estimate amounts of time it would take for a picker to perform tasks involved in servicing an order based on various types of information. Examples of such types of information include: a difference between an arrival time and a delivery time for the delivery location predicted by the time difference prediction module 224, order data associated with the order, or picker data associated with a picker servicing the order (e.g., a current location associated with the picker, a type of vehicle operated by the picker, the picker's preferences and ratings, etc.). Additional examples of such types of information include: information associated with a retailer location from which the item(s) are to be collected (e.g., days and times of day that the retailer location is busiest), weather and traffic conditions along a delivery route for the order, or any other suitable types of information. In some embodiments, the delivery time prediction module 226 may estimate an amount of time it would take for a picker to perform tasks involved in servicing an order using one or more machine learning models, which may be trained by the machine learning training module 230 based on historical information stored in the data store 240. Examples of such historical information include: order data associated with previous orders, picker data associated with pickers who serviced the previous orders, customer data associated with customers who placed the previous orders, information associated with retailer locations from which items included in the previous orders were collected, routes used by pickers to service the previous orders, weather and traffic conditions along the routes used by the pickers to service the previous orders, etc.

To illustrate an example of how the delivery time prediction module 226 may determine an estimated delivery time for an order, suppose that an order includes a few small items to be collected from a retailer location, that a current location associated with a picker, a delivery location for the order, and the retailer location are close to each other, and that the retailer location is not busy. In the above example, based on the items included in the order and the information associated with the picker and retailer location, the delivery time prediction module 226 may compute an estimated amount of time it would take the picker to travel to the retailer location, to collect and purchase the items, and to arrive at the delivery location to be 25 minutes. In this example, if a difference between an arrival time and a delivery time for the delivery location predicted by the time difference prediction module 224 is five minutes, the delivery time prediction module 226 may compute an estimated amount of time it would take the picker to perform the tasks involved in servicing the order to be 30 minutes. Continuing with the above example, the delivery time prediction module 226 may then determine an estimated delivery time for the order to be 30 minutes from a time that the picker accepted the order for servicing.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit instructions to the picker client device 110 to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer. In embodiments in which the delivery time prediction module 226 determines an estimated delivery time for an order, the order management module 220 may send the estimated delivery time for display to a customer client device 100 associated with the customer. For example, the order management module 220 may send an estimated delivery time to a customer client device 100 in association with a map indicating a current location associated with a picker servicing an order placed by the customer. In this example, the estimated delivery time may be updated by the order management module 220 and sent to the customer client device 100 as the picker performs tasks involved in servicing the order.

In some embodiments, when a picker client device 110 communicates information to the online concierge system 140 indicating that a picker associated with the picker client device 110 has arrived at a delivery location, the order management module 220 may send this information to a customer client device 100 associated with a customer associated with the order. Furthermore, in embodiments in which the time difference prediction module 224 predicts a difference between an arrival time and a delivery time for a delivery location, the predicted difference also may be sent to a customer client device 100. For example, when a picker client device 110 communicates information to the online concierge system 140 indicating that a picker associated with the picker client device 110 has arrived at a delivery location for an order, the order management module 220 may send a notification to a customer client device 100 associated with a customer associated with the order indicating that the picker has arrived. In this example, the notification also may include a number of additional minutes it will take for the picker to arrive at the customer's doorstep, in which the number of additional minutes corresponds to a difference between an arrival time and a delivery time for the delivery location predicted by the time difference prediction module 224.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner. In some embodiments, the order management module 220 may receive information describing a delivery location (e.g., a set of attributes associated with the delivery location) from a customer client device 100 or a picker client device 110 in one or more messages sent between the customer client device 100 and the picker client device 110. For example, the order management module 220 may receive a message from a customer client device 100 associated with a customer to be transmitted to a picker client device 110, in which the message includes delivery instructions for a picker associated with the picker client device 110 (e.g., to walk up three flights of stairs or to call the customer when they arrive). As an additional example, the order management module 220 may receive a message from a picker client device 110 to be transmitted to a customer client device 100, in which the message includes a question describing an attribute associated with a delivery location for an order (e.g., how to enter a gate at the delivery location).

In some embodiments, the order management module 220 may generate a prompt, a survey, a questionnaire, etc. associated with a delivery location, send it to a picker client device 110 or a customer client device 100, and receive information describing the delivery location in a response. For example, once a customer places an order with the online concierge system 140, the order management module 220 may generate a questionnaire asking the customer about a delivery location for the order, such as whether the delivery location is in a multi-unit or a single-unit building, whether it is gated or requires an access code, etc. and send the questionnaire to a customer client device 100 associated with the customer. In this example, the order management module 220 may then receive a response from the customer client device 100 describing the delivery location as being in a multi-unit building and identifying one or more attributes (e.g., a gate, an access code, etc.) associated with the delivery location. As an additional example, once a picker client device 110 communicates information to the online concierge system 140 indicating that a picker associated with the picker client device 110 has delivered an order to a delivery location, the order management module 220 may generate a questionnaire and send the questionnaire to the picker client device 110. In this example, the questionnaire may ask the picker about the delivery location, such as whether the delivery location is in a multi-unit or a single-unit building, whether the delivery location is gated or requires an access code, etc. In the above example, the order management module 220 may then receive a response from the picker client device 110 describing the delivery location as being in a multi-unit building and identifying one or more attributes (e.g., a gate, an access code, etc.) associated with the delivery location.

In some embodiments, the order management module 220 may generate and send a prompt, survey, questionnaire, etc., in response to receiving information describing an actual difference between an arrival time and a delivery time for a delivery location. In such embodiments, the order management module 220 may determine whether the actual difference between the arrival time and the delivery time for the delivery location is greater than the difference predicted by the time difference prediction module 224 and may generate and send a prompt, survey, questionnaire, etc. based on whether the actual difference is greater than the predicted difference. For example, once a picker client device 110 communicates information to the online concierge system 140 indicating arrival and delivery times for an order, the order management module 220 determines whether an actual difference between the arrival time and the delivery time is greater than a difference predicted by the time difference prediction module 224. In this example, if the order management module 220 determines that the actual difference is greater than the predicted difference, the order management module 220 may generate a questionnaire asking about attributes associated with the delivery location and send it to a customer client device 100 associated with a customer associated with the order or the picker client device 110.

In various embodiments, the order management module 220 also may generate and send a prompt, survey, questionnaire, etc., based on one or more attributes associated with a delivery location determined by the attribute determination module 222. For example, suppose that the attribute determination module 222 determines an access code is associated with a delivery location using one or more attribute prediction models, but an access code has not been provided by a customer associated with an order to be delivered to the delivery location. In this example, the order management module 220 may generate and send a prompt to a customer client device 100 associated with the customer for instructions associated with the delivery location to be sent to a picker servicing the order to help the picker deliver the order more efficiently. As an additional example, suppose that the attribute determination module 222 determines a gate is associated with a delivery location using one or more attribute prediction models. In this example, once information is received from a picker client device 110 indicating that an order has been delivered to the delivery location, the order management module 220 may generate and send a survey to the picker client device 110 to confirm whether the delivery location is gated.

Once the order management module 220 receives information describing a delivery location (e.g., in a message sent between a customer client device 100 and a picker client device 110 or in a response to a prompt, survey, questionnaire, etc.), the order management module 220 may then store the information in the data store 240. For example, information describing one or more attributes associated with a delivery location may be included among a set of attributes associated with the delivery location stored in the data store 240. Information describing a delivery location may be stored in association with various types of information (e.g., a timestamp indicating a time at which it was received, information identifying a picker associated with a picker client device 110 or a customer associated with a customer client device 100 from which it was received, etc.).

In various embodiments, the order management module 220 may generate a prompt for a customer to perform an action and send the prompt to a customer client device 100 associated with the customer. In such embodiments, the prompt may be generated based on a difference between an arrival time and a delivery time for a delivery location predicted by the time difference prediction module 224 or one or more attributes associated with the delivery location. For example, if a difference between an arrival time and a delivery time for a delivery location predicted by the time difference prediction module 224 is at least a threshold difference, the order management module 220 may generate a prompt for a customer to meet a picker at a parking lot or a gate for the delivery location when the picker arrives at the delivery location. As an additional example, if a set of attributes associated with a delivery location stored in the data store 240 indicates that the delivery location is associated with a gate and an access code, and the access code has not been provided, the order management module 220 may generate a prompt for a customer to meet a picker at the gate when the picker arrives at the delivery location. In some embodiments, a prompt may include an incentive for a customer to perform an action. In the above example, the prompt may include a financial incentive (e.g., a discount or a coupon for a subsequent order) for the customer to meet the picker at the gate. In embodiments in which the order management module 220 generates a prompt for a customer to perform an action, the prompt may be sent to a customer client device 100 associated with the customer when the online concierge system 140 receives a notification indicating that a picker has arrived at a delivery location for an order associated with the customer.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer. In various embodiments, the order management module 220 may generate a prompt for a customer to provide a tip or a higher tip for a picker servicing an order placed by the customer and send the prompt to a customer client device 100 associated with the customer. In such embodiments, the order management module 220 may generate the prompt based on a set of attributes associated with a delivery location for the order, one or more items included in the order, or any other suitable types of information. For example, suppose that information describing a delivery location stored in the data store 240 describes a set of attributes associated with the delivery location, including multiple steps, a gate, and an access code, and order data associated with an order to be delivered to the delivery location indicates that the order includes several heavy items. In this example, the order management module 220 may generate a prompt for a customer to provide a higher tip to a picker servicing the order based on the set of attributes associated with the delivery location and the order data.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model is used by the machine learning model to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

In embodiments in which the attribute determination module 222 accesses an attribute prediction model that is trained to predict a likelihood that an attribute is associated with a delivery location, the machine learning training module 230 may train the attribute prediction model. The machine learning training module 230 may train the attribute prediction model via supervised learning based on features and attributes associated with delivery locations received from one or more customer client devices 100, picker client devices 110, or third-party systems 150. Examples of features associated with a delivery location include: an address of the delivery location, a floorplan associated with the delivery location, one or more parking spots associated with the delivery location, a geographical location associated with the delivery location, or one or more buildings associated with the delivery location. Additional examples of features associated with a delivery location include: one or more dimensions of one or more buildings associated with the delivery location, one or more elevations associated with the delivery location, etc. An attribute associated with a delivery location may affect delivery times for orders delivered to the delivery location. Examples of attributes associated with a delivery location include: characteristics of a building associated with the delivery location (e.g., dimensions, number of floors or units, whether it is attached or detached, numbers or locations of steps, elevators, gates, keypads/call boxes, security desks, etc.), one or more parking spots, a floor number, or an access code associated with the delivery location, etc. For example, the machine learning training module 230 may receive a set of training examples including addresses, floorplans, and other features associated with delivery locations. In this example, the machine learning training module 230 also may receive labels from one or more customer client devices 100, picker client devices 110, or third-party systems 150. In the above example, the labels represent expected outputs of the attribute prediction model, in which a label indicates whether an attribute (e.g., an elevator) is associated with a delivery location. Continuing with this example, the machine learning training module 230 may then train the attribute prediction model based on the features associated with the delivery locations and the labels by comparing its output from input data of each training example to the label for the training example.

In embodiments in which the time difference prediction module 224 accesses a time difference prediction model that is trained to predict a difference between an arrival time and a delivery time for a delivery location, the machine learning training module 230 may train the time difference prediction model. The machine learning training module 230 may train the time difference prediction model via supervised learning based on attributes associated with delivery locations for previous orders and differences between arrival times and delivery times for the previous orders. As described above, an attribute associated with a delivery location may affect delivery times for orders delivered to the delivery location. As also described above, examples of attributes associated with a delivery location include: characteristics of a building associated with the delivery location (e.g., dimensions, number of floors or units, whether it is attached or detached, numbers or locations of steps, elevators, gates, keypads/call boxes, security desks, etc.), one or more parking spots, a floor number, or an access code associated with the delivery location, etc. In some embodiments, the machine learning training module 230 also may train the time difference prediction model based on attributes associated with previous orders. Examples of attributes associated with a previous order include: a number of items included in the order, item data for items included in the order, a delivery location for the order, information identifying a customer associated with the order, information identifying a picker servicing the order, instructions associated with the order provided by the customer, or any other suitable types of attributes. For example, the machine learning training module 230 may receive a set of training examples including attributes associated with delivery locations for previous orders (e.g., steps, elevators, gates, access codes, etc.), as well as attributes associated with the previous orders (e.g., information describing numbers of items included in the previous orders, weights of the items, etc.). In this example, the machine learning training module 230 also may receive labels which represent expected outputs of the time difference prediction model, in which a label indicates a difference between an arrival time and a delivery time for a delivery location for a previous order (e.g., in minutes or seconds). Continuing with this example, the machine learning training module 230 may then train the time difference prediction model based on the attributes associated with the delivery locations and previous orders and the labels by comparing its output from input data of each training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. As an additional example, the data store 240 stores information describing one or more delivery locations. In some embodiments, the data store 240 may store information describing a delivery location in association with a set of rules indicating a reliability of the information based on a source from which the information was received, a time that the information was received or updated, or any other suitable factor. For example, a set of rules stored in the data store 240 may indicate that information describing a delivery location received from a customer client device 100, a picker client device 110, or a third-party system 150 is more reliable than information describing the delivery location determined by the attribute determination module 222. As an additional example, a set of rules stored in the data store 240 may indicate that information describing a delivery location received or updated more recently is more reliable than information describing the delivery location received or updated earlier, such that a reliability of the information describing the delivery location is proportional to how recently it was received or updated. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
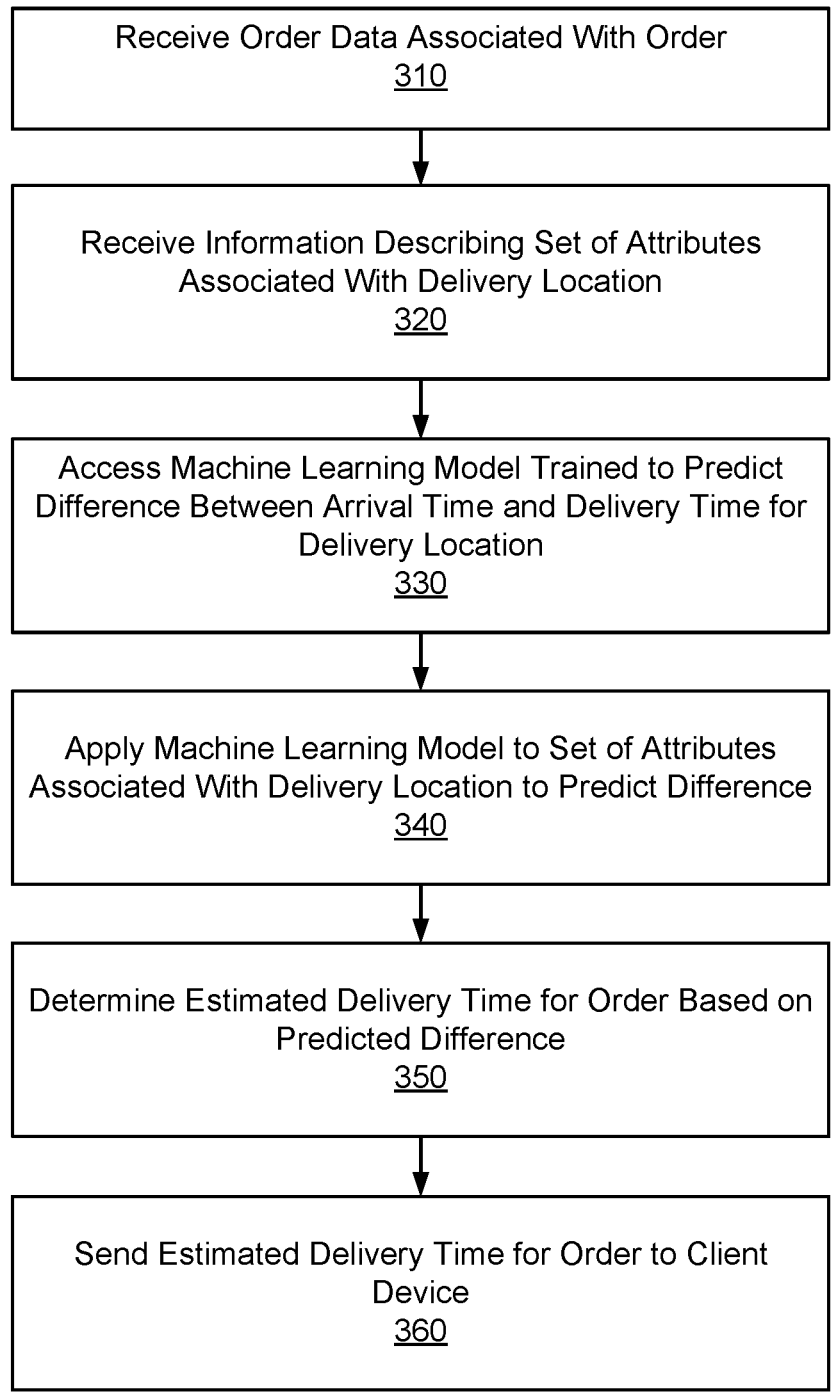
FIG. 3 is a flowchart of a method for estimating a delivery time for an order placed with an online concierge system using an attribute-based prediction of a difference between an arrival time and a delivery time for a delivery location, in accordance with one or more embodiments.

Estimating a Delivery Time for an Order Placed with an Online Concierge System Using an Attribute-Based Prediction of a Difference Between an Arrival Time and a Delivery Time for a Delivery Location FIG. 3 is a flowchart of a method for estimating a delivery time for an order placed with an online concierge system 140 using an attribute-based prediction of a difference between an arrival time and a delivery time for a delivery location, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140) in various embodiments, while in other embodiments, the steps of the method are performed by any online system capable of retrieving items. Additionally, each of these steps may be performed automatically by the online concierge system 140 without human intervention.

Figure 4A:
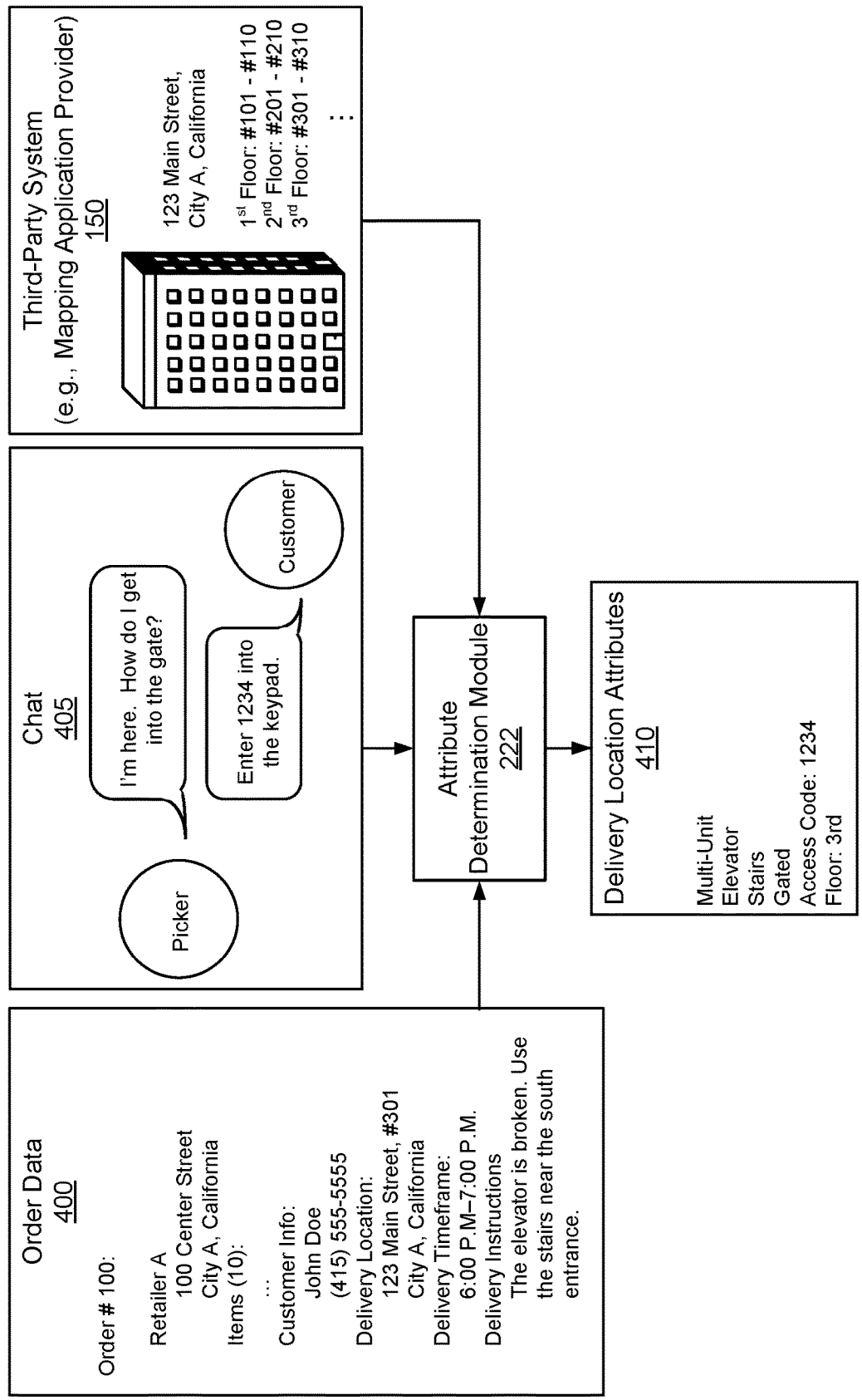
FIG. 4A illustrates an example of determining a set of attributes associated with a delivery location, in accordance with one or more embodiments.

The online concierge system 140 receives 310 (e.g., via the order management module 220), from a customer client device 100 associated with a customer, order data associated with an order placed with the online concierge system 140, in which the order data describes a delivery location for the order. As shown in FIG. 4A, which illustrates an example of determining a set of attributes associated with a delivery location, in accordance with one or more embodiments, the order data 400 associated with the order received 310 by the online concierge system 140 may include various types of information. In this example, the order data 400 includes an order number identifying the order, a name and an address associated with a retailer location from which items included in the order are to be collected, a number of items included in the order, a name and phone number associated with the customer, an address of the delivery location for the order, a delivery timeframe, and delivery instructions provided by the customer. In some embodiments, once the online concierge system 140 receives 310 the order data 400 associated with the order, the order data 400 may be stored in the online concierge system 140 (e.g., among other order data 400 in the data store 240).

Referring back to FIG. 3, the online concierge system 140 may then receive 320 (e.g., via the data collection module 200 or the order management module 220) information describing the delivery location. The information describing the delivery location may describe a type of the delivery location (e.g., office, residence, etc.), one or more buildings associated with the delivery location (e.g., single-unit, multi-unit, detached, semi-detached, attached, etc.), how the delivery location may be accessed (e.g., via a gate, an access code, a keypad/call box, a security desk, etc.), one or more parking spots associated with the delivery location, or any other suitable types of information. For example, suppose that the delivery location is a detached house within a guard-gated neighborhood. In this example, information describing the delivery location may indicate that the delivery location is a detached single-unit residence in a gated community that may be accessed by speaking to a guard. Information describing the delivery location may include various types of data (e.g., text data, image data, video data, audio data, etc.). In the above example, the information describing the delivery location may include a combination of text data (e.g., words or phrases indicating that the delivery location is a detached single-unit residence) and image data (e.g., an image of the guard-gated entrance to the neighborhood).

The information describing the delivery location also may describe a set of attributes associated with the delivery location. In some embodiments, an attribute associated with the delivery location may affect delivery times for orders delivered to the delivery location. Examples of attributes that may be associated with the delivery location include: characteristics of a building associated with the delivery location (e.g., dimensions, number of floors or units, whether it is attached or detached, numbers or locations of steps, elevators, gates, keypads/call boxes, security desks, etc.), one or more parking spots, a floor number, or an access code associated with the delivery location, or any other suitable attributes. For example, if the delivery location is a unit within a multi-building apartment complex, the information describing the delivery location may indicate that the delivery location is a residential apartment complex and that access to the delivery location requires permission from a resident that may be requested via a call box. In this example, the information describing the delivery location further may describe locations of the unit, the call box, and one or more parking spots included in a parking lot associated with the delivery location.

In various embodiments, the information describing the delivery location may be received 320 from one or more customer client devices 100. For example, the information describing the delivery location may be received 320 from the customer client device 100 from which the order data 400 was received 310 or another customer client device 100 associated with another customer associated with the delivery location. In some embodiments, the information describing the delivery location may be received 320 from a customer client device 100 when a customer associated with the customer client device 100 creates an account with the online concierge system 140 or places an order with the online concierge system 140 (e.g., via the ordering interface). For example, when a customer creates an account with the online concierge system 140, if the delivery location is associated with the customer, the information describing the delivery location may be received 320 from a customer client device 100 associated with the customer in the form of default delivery instructions (e.g., "leave the order at the security desk near the stairs"). In this example, the information describing the delivery location may describe a set of attributes associated with the delivery location corresponding to stairs and a security desk. As an additional example, as shown in FIG. 4A, the following delivery instructions may be included in the order data 400 received 310 from the customer client device 100 when the customer places the order with the online concierge system 140: "The elevator is broken. Use the stairs near the south entrance." In this example, the information describing the delivery location may describe a set of attributes associated with the delivery location corresponding to an elevator and stairs.

In various embodiments, the online concierge system 140 also may generate a prompt, a survey, a questionnaire, etc. associated with the delivery location, send it to a customer client device 100, and receive 320 the information describing the delivery location from the customer client device 100 in a response (e.g., via the order management module 220). For example, once a customer places an order with the online concierge system 140 to be delivered to the delivery location, the online concierge system 140 may generate a questionnaire asking the customer about the delivery location, such as whether it is in a multi-unit or a single-unit building, whether it is gated or requires an access code, etc. and send the questionnaire to a customer client device 100 associated with the customer. In this example, the online concierge system 140 may then receive 320 a response from the customer client device 100 describing the delivery location as being in a multi-unit building and identifying one or more attributes (e.g., a gate, an access code, etc.) associated with the delivery location.

In various embodiments, the information describing the delivery location also or alternatively may be received 320 from one or more picker client devices 110. For example, the information describing the delivery location may be received 320 from a picker client device 110 associated with a picker servicing the order associated with the order data 400 received 310 by the online concierge system 140 or a previous order delivered to the delivery location. In some embodiments, the online concierge system 140 may generate a prompt, a survey, a questionnaire, etc. associated with the delivery location, send it to a picker client device 110, and receive 320 the information describing the delivery location from the picker client device 110 in a response (e.g., via the order management module 220). For example, once a picker client device 110 communicates information to the online concierge system 140 indicating that a picker associated with the picker client device 110 has delivered an order to the delivery location, the online concierge system 140 may send a questionnaire to the picker client device 110. In this example, the questionnaire may ask the picker about the delivery location, such as whether the delivery location is in a multi-unit or a single-unit building, whether the delivery location is gated or requires an access code, etc. In the above example, the online concierge system 140 may then receive 320 a response from the picker client device 110 describing the delivery location as being in a multi-unit building and identifying one or more attributes (e.g., a gate, an access code, etc.) associated with the delivery location.

The information describing the delivery location also may be received 320 from a customer client device 100 in one or more messages sent by the customer client device 100 to a picker client device 110 or from a picker client device 110 in one or more messages sent by the picker client device 110 to a customer client device 100. For example, the online concierge system 140 may receive 320 a message from a customer client device 100 to be transmitted to a picker client device 110 for presentation to a picker servicing the order associated with the order data 400 received 310 by the online concierge system 140 or a previous order delivered to the delivery location. In this example, the message may include delivery instructions describing one or more attributes associated with the delivery location (e.g., how to enter a gate at the delivery location, to walk up three flights of stairs, etc.). As an additional example, as shown in FIG. 4A, the online concierge system 140 may receive (step 320) messages included in a chat 405 sent between a picker client device 110 and a customer client device 100. In this example, one message may ask a customer about an attribute associated with the delivery location corresponding to a gate, while another message may describe another attribute associated with the delivery location corresponding to an access code.

In various embodiments, the online concierge system 140 also or alternatively may receive 320 the information describing the delivery location from one or more third-party systems 150. In such embodiments, the online concierge system 140 may receive 320 the information describing the delivery location via one or more applications, websites, databases, etc. provided by or maintained by the third-party system(s) 150. For example, as shown in FIG. 4A, the online concierge system 140 may receive 320 the information describing the delivery location from a third-party system 150 that provides a mapping application. In this example, the information received 320 from the third-party system 150 may indicate that an address of the delivery location is associated with a multi-unit building and that 10 units are located on each floor, in which the first number of the unit corresponds to the floor number in which the unit is located. As an additional example, the online concierge system 140 may receive 320 the information describing the delivery location from a third-party system 150 that maintains a database of floorplans, in which the information includes image data corresponding to a floorplan associated with the delivery location. In some embodiments, the information describing the delivery location received 320 from a third-party system 150 may be publicly available. For example, the information describing the delivery location received 320 from a third-party system 150 that provides a public online directory service may be stored in public databases or included among other types of public records. The information describing the delivery location may be received 320 from a third-party system 150 in association with various types of information (e.g., a timestamp indicating when it was received 320 or last updated, information identifying the third-party system 150, etc.).

In some embodiments, once the online concierge system 140 receives 320 the information describing the delivery location, the online concierge system 140 may determine (e.g., using the attribute determination module 222) one or more of the set of attributes associated with the delivery location. The online concierge system 140 may determine the attribute(s) based on the information describing the delivery location received 320 from one or more customer client devices 100, picker client devices 110, or third-party systems 150. For example, suppose that the information describing the delivery location is received 320 from a third-party system 150 that maintains a public database describing various neighborhoods. In this example, if the information indicates that the delivery location is in a gated residential neighborhood and that the neighborhood includes detached single-family houses, the online concierge system 140 may determine that the delivery location is a detached single-unit building in a gated community.

The information describing the delivery location used by the online concierge system 140 to determine the attribute(s) associated with the delivery location may include various types of data (e.g., text data, image data, video data, audio data, etc.). In embodiments in which the information describing the delivery location includes text data, the online concierge system 140 may preprocess the text data (e.g., using one or more machine learning models, natural language processing (NLP) techniques, such as tokenization, normalization, etc., embeddings, etc.). For example, as shown in FIG. 4A, suppose that the information describing the delivery location received 320 from the picker client device 110 during the chat 405 includes the following text: "I'm here. How do I get into the gate?" and that a response received 320 from the customer client device 100 includes the following text: "Enter 1234 into the keypad." In this example, the online concierge system 140 may preprocess the text and determine that the delivery location is associated with a gate and an access code of 1234. In some embodiments, the online concierge system 140 also may preprocess text data describing the delivery location into a standardized set of instructions that may be stored in association with customer data for a customer associated with the delivery location or information describing the delivery location (e.g., in the data store 240). In the above example, the online concierge system 140 may preprocess the text into a standardized set of instructions indicating that the delivery location requires the access code of 1234. In embodiments in which the information describing the delivery location includes image or video data, the online concierge system 140 may determine the attribute(s) associated with the delivery location using object detection or other computer vision techniques. For example, based on image data corresponding to a street view of the delivery location, the online concierge system 140 may use an object detection algorithm to identify a multi-story apartment building associated with the delivery location, as well as stairs and a gate associated with the delivery location.

In some embodiments, the online concierge system 140 also may determine the attribute(s) associated with the delivery location based on a set of features associated with the delivery location. In such embodiments, the set of features may be included among the information describing the delivery location received 320 from one or more customer client devices 100, picker client devices 110, or third-party systems 150. Features associated with the delivery location may include an address of the delivery location, a floorplan associated with the delivery location, one or more parking spots associated with the delivery location, a geographical location associated with the delivery location, or one or more buildings associated with the delivery location. Features associated with the delivery location also may include one or more dimensions of one or more buildings associated with the delivery location, one or more elevations associated with the delivery location, or any other suitable features. For example, as shown in FIG. 4A, based on a unit number (i.e., #301) included in an address of the delivery location received 310 from the customer client device 100 and delivery instructions mentioning an elevator and stairs, the online concierge system 140 may determine that the delivery location is in a multi-unit building that has attributes 410 corresponding to an elevator and stairs. In the above example, based on the information received 320 from the picker client device 110 and the customer client device 100 in the chat 405 mentioning a gate and a sequence of numbers (i.e., 1234) that may be entered into a keypad, the online concierge system 140 also may determine that the delivery location is gated and requires an access code of 1234. Continuing with the above example, based on the information received 320 from the third-party system 150 indicating that the address of the delivery location is associated with a multi-unit building and that the first number of the unit corresponds to the floor number in which the unit is located, the online concierge system 140 also may determine that the delivery location is located on the third floor of the building.

In some embodiments, the online concierge system 140 may determine the attribute(s) 410 associated with the delivery location using one or more attribute prediction models that may be trained by the online concierge system 140 (e.g., using the machine learning training module 230). An attribute prediction model is a machine learning model that is trained to predict a likelihood that an attribute 410 is associated with a delivery location. For example, one attribute prediction model may be trained to predict a likelihood that a delivery location is gated, while another attribute prediction model may be trained to predict a likelihood that a delivery location has stairs. In embodiments in which the online concierge system 140 determines the attribute(s) 410 associated with the delivery location using one or more attribute prediction models, the online concierge system 140 may access the model(s) (e.g., from the data store 240) and apply the model(s) to one or more features associated with the delivery location to predict one or more likelihoods that one or more attributes 410 are associated with the delivery location. The online concierge system 140 may then receive one or more outputs from the attribute prediction model(s) corresponding to the predicted likelihood(s) and the online concierge system 140 may determine the attribute(s) 410 associated with the delivery location based on the predicted likelihood(s). For example, the online concierge system 140 may apply an attribute prediction model to features of the delivery location, such as an address of the delivery location, a floorplan associated with the delivery location, one or more dimensions of one or more buildings associated with the delivery location, etc. In this example, the online concierge system 140 may then receive an output from the attribute prediction model corresponding to a predicted likelihood that an attribute (e.g., stairs) 410 is associated with the delivery location and determine that the attribute 410 is associated with the delivery location if the predicted likelihood is at least a threshold likelihood.

In embodiments in which the online concierge system 140 generates a prompt, survey, questionnaire, etc., and sends it to a customer client device 100 or a picker client device 110, it may do so based on the attribute(s) 410 associated with the delivery location determined by the online concierge system 140. For example, suppose that the online concierge system 140 determines an access code is associated with the delivery location using one or more attribute prediction models, but an access code has not been provided by a customer associated with an order to be delivered to the delivery location. In this example, the online concierge system 140 may generate and send a prompt to a customer client device 100 associated with the customer for instructions associated with the delivery location to be sent to a picker servicing the order to help the picker deliver the order more efficiently. As an additional example, suppose that the online concierge system 140 determines a gate is associated with the delivery location using one or more attribute prediction models. In this example, once information is received from a picker client device 110 indicating that an order has been delivered to the delivery location, the online concierge system 140 may generate and send a survey to the picker client device 110 to confirm whether the delivery location is gated.

In some embodiments, the online concierge system 140 may store (e.g., using the data collection module 200) the information describing the delivery location (e.g., in the data store 240). For example, once information describing one or more attributes 410 associated with the delivery location is received 320 or determined, the attribute(s) 410 may be included among the set of attributes 410 associated with the delivery location stored in the online concierge system 140. The information describing the delivery location may be stored in association with various types of information (e.g., a timestamp indicating a time at which it was received 320, information identifying a picker associated with a picker client device 110, a customer associated with a customer client device 100, or a third-party system 150 from which it was received 320, etc.). In some embodiments, the information describing the delivery location may be stored in association with a set of rules indicating a reliability of the information based on a source from which the information was received 320, a time that the information was received 320 or updated, or any other suitable factor. For example, a set of rules stored in the online concierge system 140 may indicate that information describing the delivery location received 320 from a customer client device 100, a picker client device 110, or a third-party system 150 is more reliable than information describing the delivery location determined by the online concierge system 140. As an additional example, a set of rules stored in the online concierge system 140 may indicate that information describing the delivery location received 320 or updated more recently is more reliable than information describing the delivery location received 320 or updated earlier, such that a reliability of the information describing the delivery location is proportional to how recently it was received 320 or updated.

The online concierge system 140 may then predict (e.g., using the time difference prediction module 224) a difference between an arrival time and a delivery time for the delivery location. The difference between the arrival time and the delivery time for the delivery location corresponds to a difference between a time that a picker arrives at the delivery location for an order and a time that the picker delivers the order to the delivery location. In some embodiments, the online concierge system 140 may predict the difference between the arrival time and the delivery time for the delivery location based on the set of attributes 410 associated with the delivery location, attributes 410 associated with delivery locations for previous orders, and differences between arrival times and delivery times for these delivery locations. For example, the online concierge system 140 may predict the difference between the arrival time and the delivery time for the delivery location based on differences between arrival times and delivery times for delivery locations associated with attributes 410 that are similar to those associated with the delivery location. In some embodiments, the online concierge system 140 may predict the difference between the arrival time and the delivery time for the delivery location based on reliabilities of attributes 410 associated with the delivery location (e.g., by weighing more reliable attributes 410 more heavily than less reliable attributes 410). In such embodiments, a reliability of an attribute 410 may be determined by the online concierge system 140 based on a set of rules indicating the reliability of the attribute 410 (e.g., based on a source from which the attribute 410 was received 320, a time that the attribute 410 was received 320 or updated, etc.), which may be stored in association with the attribute 410 (e.g., in the data store 240), as described above.

Figure 4B:
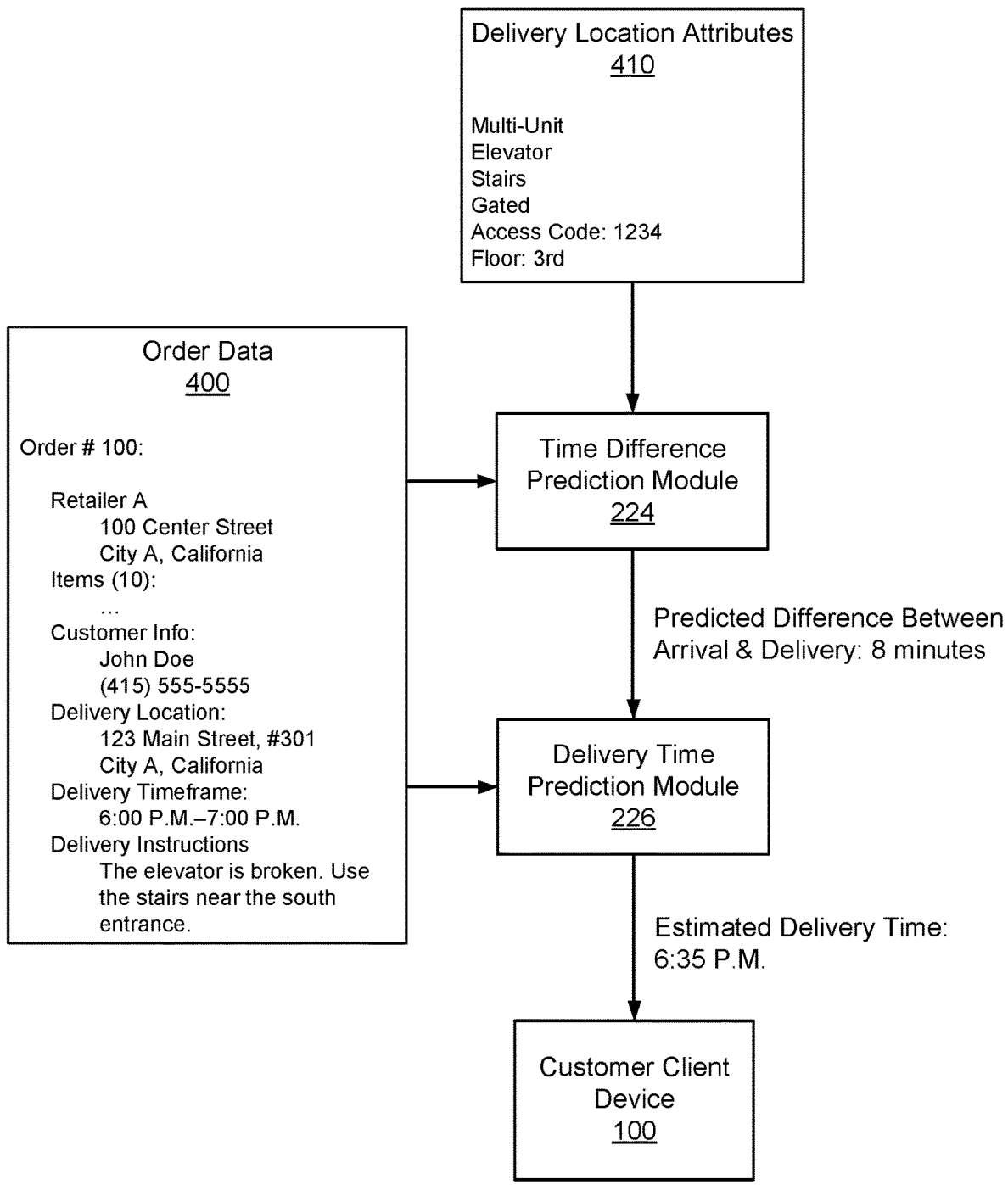
FIG. 4B illustrates an example of determining an estimated delivery time for an order based on a predicted difference between an arrival time and a delivery time for a delivery location and order data, in accordance with one or more embodiments.

In various embodiments, the online concierge system 140 also may predict the difference between the arrival time and the delivery time for the delivery location based on attributes associated with the order associated with the order data 400 received 310 by the online concierge system 140, which may be included among the order data 400. Examples of attributes associated with the order include: a number of items included in the order, item data for items included in the order, the delivery location, information identifying the customer associated with the order, information identifying a picker servicing the order, instructions associated with the order provided by the customer, or any other suitable types of attributes. For example, the online concierge system 140 may predict a greater difference between the arrival time and the delivery time for the delivery location if the order includes a large number of heavy items than if the order includes a small number of light items. FIG. 4B illustrates an example of determining an estimated delivery time for an order based on a predicted difference between an arrival time and a delivery time for a delivery location and order data 400, in accordance with one or more embodiments, and continues the example described above in conjunction with FIG. 4A. As shown in FIG. 4B, based on the order data 400 and attributes 410 associated with the delivery location (e.g., 10 items, multi-unit, elevator, stairs, gated, access code of 1234, and on the third floor), the online concierge system 140 may predict the difference between the arrival time and the delivery time for the delivery location of eight minutes.

Referring again to FIG. 3, in some embodiments, the online concierge system 140 predicts the difference between the arrival time and the delivery time for the delivery location using a time difference prediction model, which is a machine learning model (e.g., a regression model) that is trained to predict a difference between an arrival time and a delivery time for a delivery location. In various embodiments, the time difference prediction model may be trained by the online concierge system 140 (e.g., using the machine learning training module 230). To use the time difference prediction model, the online concierge system 140 may access 330 the model (e.g., from the data store 240) and apply 340 the model to the set of attributes 410 associated with the delivery location. In some embodiments, the online concierge system 140 also may apply 340 the time difference prediction model to a set of attributes associated with the order associated with the received 310 order data 400. The online concierge system 140 may then receive an output from the time difference prediction model corresponding to the predicted difference between the arrival time and the delivery time for the delivery location (e.g., in minutes or seconds). For example, the online concierge system 140 may access 330 and apply 340 the time difference prediction model to the set of attributes 410 associated with the delivery location (e.g., one or more steps, elevators, floors, buildings, gates, keypads/call boxes, security desks, etc. associated with the delivery location, one or more parking spots and an access code associated with the delivery location, etc.). In this example, the online concierge system 140 also may apply 340 the time difference prediction model to a set of attributes associated with the order, such as information describing a number of items included in the order, a weight of each item included in the order, a size of each item included in the order, etc. Continuing with this example, the online concierge system 140 may then receive an output from the time difference prediction model corresponding to the predicted difference between the arrival time and the delivery time for the delivery location.

The online concierge system 140 may then generate (e.g., using the order management module 220) a request to fulfill the order associated with the received 310 order data 400. The request to fulfill the order may include the order data 400 associated with the order (e.g., a number of items included in the order, a retailer location from which the items are to be collected, the delivery location for the order, a delivery timeframe for the order, instructions provided by the customer associated with the order, etc.), a pay rate or a tip for servicing the order, or any other suitable types of information. In some embodiments, the online concierge system 140 may generate the request to fulfill the order based at least in part on the difference between the arrival time and the delivery time for the delivery location predicted by the online concierge system 140, information describing the order or delivery location stored in the online concierge system 140 (e.g., in the data store 240), or any other suitable data. For example, if the predicted difference between the arrival time and the delivery time for the delivery location is at least a threshold difference, the online concierge system 140 may increase a pay rate for servicing the order or add a service fee in a request to fulfill the order. As an additional example, suppose that information describing the delivery location stored in the online concierge system 140 describes the set of attributes 410 associated with the delivery location (e.g., multiple steps, a gate, and an access code) and the order data 400 associated with the order to be delivered to the delivery location indicates the order includes several heavy items. In this example, the online concierge system 140 may generate a request to fulfill the order that includes information describing the set of attributes 410 and items. Once generated, the request to fulfill the order may then be sent to one or more picker client devices 110 associated with one or more pickers who may service the order.

In embodiments in which the request to fulfill the order includes a tip for servicing the order, the tip may be specified in response to a prompt to provide a tip or a higher tip that the online concierge system 140 generated and sent to the customer client device 100 from which the order data 400 was received 310 (e.g., via the order management module 220). In such embodiments, the online concierge system 140 may generate the prompt based on the set of attributes 410 associated with the delivery location, one or more items included in the order, or any other suitable types of information. For example, suppose that the information describing the delivery location (e.g., stored in the data store 240) describes the set of attributes 410 associated with the delivery location, including multiple steps, a gate, and an access code, and the order data 400 associated with the order indicates that the order includes several heavy items. In this example, the online concierge system 140 may generate a prompt for the customer to provide a higher tip to a picker servicing the order based on the set of attributes 410 associated with the delivery location and the order data 400.

The online concierge system 140 then determines 350 (e.g., using the delivery time prediction module 226) an estimated delivery time for the order associated with the received 310 order data 400. The online concierge system 140 may do so once the request to fulfill the order has been accepted by a picker. The estimated delivery time for the order may be determined 350 based on estimated amounts of time it would take for the picker to perform tasks involved in servicing the order (e.g., to travel to a retailer location to collect one or more items included in the order, to collect the item(s), to purchase the item(s), to travel to the delivery location for the order, and to deliver the order). The online concierge system 140 may estimate the amount of time it would take for the picker to perform the tasks based on various types of information. Examples of such types of information include: the difference between the arrival time and the delivery time for the delivery location predicted by the online concierge system 140, the order data 400 associated with the order, or picker data associated with the picker servicing the order (e.g., a current location associated with the picker, a type of vehicle operated by the picker, the picker's preferences and ratings, etc.). Additional examples of such types of information include: information associated with a retailer location from which the item(s) are to be collected (e.g., days and times of day that the retailer location is busiest), weather and traffic conditions along a delivery route for the order, or any other suitable types of information. In some embodiments, the online concierge system 140 may estimate the amount of time it would take for the picker to perform tasks involved in servicing the order using one or more machine learning models, which may be trained by the online concierge system 140 (e.g., using the machine learning training module 230) based on historical information stored in the data store 240. Examples of such historical information include: order data 400 associated with previous orders, picker data associated with pickers who serviced the previous orders, customer data associated with customers who placed the previous orders, information associated with retailer locations from which items included in the previous orders were collected, routes used by pickers to service the previous orders, weather and traffic conditions along the routes used by the pickers to service the previous orders, etc.

To illustrate an example of how the online concierge system 140 may determine 350 the estimated delivery time for the order, suppose that the order includes 10 items to be collected from a retailer location that is in the same city as the delivery location, as shown in FIG. 4B. In this example, suppose also that a current location associated with the picker, the delivery location, and the retailer location are close to each other, that the retailer location is not busy, that current weather and traffic conditions are good along a route for delivering the order, etc. In the above example, based on the order data 400, the information associated with the picker and retailer location, the traffic conditions, etc., the online concierge system 140 may compute an estimated amount of time it would take the picker to travel to the retailer location, to collect and purchase the items, and to arrive at the delivery location to be 27 minutes. In this example, if the difference between the arrival time and the delivery time for the delivery location predicted by the online concierge system 140 is eight minutes, the online concierge system 140 may compute an estimated amount of time it would take the picker to perform the tasks involved in servicing the order to be 35 minutes. Continuing with the above example, if it is 6:00 P.M. and the picker has just accepted the order for servicing, the online concierge system 140 may then determine 350 the estimated delivery time for the order to be 35 minutes from the current time (i.e., 6:35 P.M.).

Referring once more to FIG. 3, once the online concierge system 140 determines 350 the estimated delivery time for the order, the online concierge system 140 may send 360 (e.g., using the order management module 220) the estimated delivery time for display to the customer client device 100 from which the order data 400 was received 310. For example, the online concierge system 140 may send 360 the estimated delivery time to the customer client device 100 in association with a map indicating a current location associated with the picker servicing the order. In this example, the estimated delivery time may be updated by the online concierge system 140 (e.g., using the order management module 220) and sent 360 to the customer client device 100 as the picker performs tasks involved in servicing the order.

As the picker performs the tasks involved in servicing the order, the picker client device 110 may communicate information to the online concierge system 140 indicating that the picker has arrived at the delivery location. The picker may have arrived at the delivery location when they have parked their vehicle in a parking lot for the delivery location, when they have arrived at a gate at the delivery location, etc. This information may be communicated to the online concierge system 140 in association with various types of information (e.g., a timestamp indicating when the picker arrived, an order number for the order, etc.). The picker client device 110 may communicate information to the online concierge system 140 indicating that the picker has arrived at the delivery location based on various events. In some embodiments, this may occur when a change in signal is detected by a sensor (e.g., an accelerometer, an altimeter, a gyroscope, a GPS sensor, a Bluetooth sensor, etc.) included in the picker client device 110. In various embodiments, the information may be communicated to the online concierge system 140 when it is manually entered into the picker client device 110, when the picker client device 110 enters or exits a virtual boundary (e.g., a geofence) associated with the delivery location, or upon any other suitable event. For example, information indicating that the picker has arrived at the delivery location may be communicated to the online concierge system 140 by the picker client device 110 associated with the picker when it loses Bluetooth connectivity with a vehicle and GPS coordinates associated with the picker client device 110 indicate that the picker client device 110 is within a threshold distance of the delivery location. As an additional example, information indicating that the picker has arrived at the delivery location may be communicated to the online concierge system 140 by the picker client device 110 associated with the picker when the picker client device 110 enters a geofence associated with a building in which the delivery location is located.

In some embodiments, when the picker client device 110 associated with the picker servicing the order communicates information to the online concierge system 140 indicating that the picker has arrived at the delivery location, the online concierge system 140 may send (e.g., using the order management module 220) this information to the customer client device 100 from which the order data 400 was received 310. Furthermore, in embodiments in which the online concierge system 140 predicts the difference between the arrival time and the delivery time for the delivery location, the predicted difference also may be sent to the customer client device 100. For example, when the picker client device 110 communicates information to the online concierge system 140 indicating that the picker has arrived at the delivery location, the online concierge system 140 may send a notification to the customer client device 100 indicating that the picker has arrived. In this example, the notification also may include a number of additional minutes it will take for the picker to arrive at the customer's doorstep, in which the number of additional minutes corresponds to the difference between the arrival time and the delivery time for the delivery location predicted by the online concierge system 140.

In various embodiments, the online concierge system 140 may generate a prompt for a customer associated with the received 310 order data 400 to perform an action and send the prompt to a customer client device 100 associated with the customer (e.g., via the order management module 220). In such embodiments, the prompt may be generated based on the difference between the arrival time and the delivery time for the delivery location predicted by the online concierge system 140 or one or more attributes 410 associated with the delivery location. For example, if the difference between the arrival time and the delivery time for the delivery location predicted by the online concierge system 140 is at least a threshold difference, the online concierge system 140 may generate a prompt for the customer to meet the picker at a parking lot or a gate for the delivery location when the picker arrives at the delivery location. As an additional example, if the set of attributes 410 associated with the delivery location (e.g., stored in the data store 240) indicates that the delivery location is associated with a gate and an access code, and the access code has not been provided, the online concierge system 140 may generate a prompt for the customer to meet the picker at the gate when the picker arrives at the delivery location. In some embodiments, a prompt may include an incentive for the customer to perform the action. In the above example, the prompt may include a financial incentive (e.g., a discount or a coupon for a subsequent order) for the customer to meet the picker at the gate. In embodiments in which the online concierge system 140 generates a prompt for the customer to perform an action, the prompt may be sent to the customer client device 100 when the online concierge system 140 receives a notification indicating the picker has arrived at the delivery location.

As the picker performs the tasks involved in servicing the order associated with the received 310 order data 400, the picker client device 110 also may communicate information to the online concierge system 140 indicating that the picker has delivered the order to the delivery location. The picker may have delivered the order once they have handed all items included in the order to a customer at the delivery location, once they have dropped off the items at a drop-off location specified in the received 310 order data (e.g., the front door), etc. Information indicating that the picker has delivered the order to the delivery location may be communicated to the online concierge system 140 in association with various types of information (e.g., a timestamp indicating when the order was delivered, an order number for the order, etc.). Similar to information indicating that the picker has arrived at the delivery location, information indicating that the picker has delivered the order to the delivery location may be communicated to the online system 140 based on various events (e.g., when a change in signal is detected by a sensor included in the picker client device 110, when it is manually entered into the picker client device 110, etc.). For example, information indicating that the picker has delivered the order to the delivery location may be communicated to the online concierge system 140 by the picker client device 110 associated with the picker when the information is manually entered into the picker client device 110.

In some embodiments, the online concierge system 140 also may generate a prompt, a survey, a questionnaire, etc. associated with the delivery location and send it to the picker client device 110 associated with the picker who serviced the order associated with the received 310 order data 400 or the customer client device 100 from which the order data 400 was received 310 (e.g., via the order management module 220). For example, suppose that the picker client device 110 communicates information to the online concierge system 140 indicating that the order has been delivered to the delivery location. In this example, the online concierge system 140 may generate a questionnaire asking the picker about attributes 410 associated with the delivery location, such as whether the delivery location is gated, whether the delivery location requires an access code, etc. and send the questionnaire to the picker client device 110. In the above example, the online concierge system 140 may then receive 320 a response from the picker client device 110 identifying one or more attributes 410 (e.g., a gate, an access code, etc.) associated with the delivery location.

In some embodiments, the online concierge system 140 may generate and send a prompt, a survey, a questionnaire, etc. associated with the delivery location in response to receiving information describing an actual difference between the arrival time and the delivery time for the delivery location. In such embodiments, the online concierge system 140 may determine (e.g., using the order management module 220) whether the actual difference between the arrival time and the delivery time for the delivery location is greater than the difference predicted by the online concierge system 140 and may generate and send a prompt, survey, questionnaire, etc. based on whether the actual difference is greater than the predicted difference. For example, once the picker client device 110 communicates information to the online concierge system 140 indicating the arrival and delivery times for the order, the online concierge system 140 may determine whether an actual difference between the arrival time and the delivery time is greater than the difference predicted by the online concierge system 140. In this example, if the online concierge system 140 determines that the actual difference is greater than the predicted difference, the online concierge system 140 may then generate a questionnaire asking about attributes 410 associated with the delivery location and send it to the customer client device 100 or the picker client device 110.

The online concierge system 140 may then collect (e.g., using the order collection module 200) additional order data 400 associated with the order and store it (e.g., in the data store 240). The online concierge system 140 may collect the additional order data 400 associated with the order from the customer client device 100, the picker client device 110, or from the customer's or picker's interactions with the online concierge system 140. For example, the additional order data 400 associated with the order may include a timestamp indicating when the picker servicing the order arrived at the delivery location for the order and another timestamp indicating when the picker delivered the order. As an additional example, the additional order data 400 associated with the order may include the content of each message between the picker client device 110 and the customer client device 100 and a timestamp associated with each message. As yet another example, the additional order data 400 may include a response to a prompt, a survey, or a questionnaire associated with the delivery location sent to the picker client device 110 or the customer client device 100.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
    receiving, from a client device associated with a user of an online concierge system, order data associated with an order placed with the online concierge system, wherein the order data describes a delivery location for the order;
    receiving information describing a set of attributes associated with the delivery location;
    accessing a machine learning model trained to predict a difference between an arrival time and a delivery time for the delivery location, wherein the machine learning model is trained by:
        receiving a plurality of attributes associated with a plurality of delivery locations, wherein the plurality of delivery locations is associated with a plurality of orders,
        receiving, for each order of the plurality of orders, a label indicating the difference between the arrival time and the delivery time, and
        training the machine learning model based at least in part on the plurality of attributes associated with the plurality of delivery locations and the label for each order of the plurality of orders;
    applying, by a time difference prediction module executed by a computer processor, the machine learning model to the set of attributes associated with the delivery location to predict the difference between the arrival time and the delivery time for the delivery location;
    determining an actual difference between the arrival time and the delivery time for the order;
    in response to a difference between the predicted difference and actual difference being at least a threshold difference, sending a prompt for attributes associated with the delivery location for display to the client device; and
    training the machine learning model on attributes associated with the delivery location received from the client device in response to the prompt and a label indicating the actual difference between the arrival time and delivery time for the order.

2. The method of claim 1, wherein the set of attributes associated with the delivery location comprises one or more of: a number of steps associated with the delivery location, a number of elevators associated with the delivery location, a number of units associated with the delivery location, a number of floors included in a building associated with the delivery location, a floor number associated with the delivery location, one or more dimensions of the building associated with the delivery location, a gate associated with the delivery location, a call box associated with the delivery location, a security desk associated with the delivery location, or an access code associated with the delivery location.

3. The method of claim 1, wherein the information describing the set of attributes associated with the delivery location is received from one or more of: a customer client device associated with a customer of the online concierge system, a picker client device associated with a picker associated with the online concierge system, or a third-party system.

4. The method of claim 1, further comprising:
accessing an additional machine learning model trained to predict a likelihood that an attribute is associated with the delivery location, wherein the additional machine learning model is trained by:
receiving information describing a plurality of features associated with an additional plurality of delivery locations,
receiving, for each additional delivery location of the plurality of additional delivery locations, an additional label indicating whether the attribute is associated with a corresponding additional delivery location, and
training the additional machine learning model based at least in part on the plurality of features associated with the additional plurality of delivery locations and the additional label for each additional delivery location of the plurality of additional delivery locations;
applying the additional machine learning model to a set of features associated with the delivery location to predict the likelihood that the attribute is associated with the delivery location; and
determining one or more attributes of the set of attributes associated with the delivery location based at least in part on the predicted likelihood that the attribute is associated with the delivery location.

5. The method of claim 4, wherein the set of features associated with the delivery location comprises one or more of: an address associated with the delivery location, a floorplan associated with the delivery location, one or more parking spots associated with the delivery location, a geographical location associated with the delivery location, one or more buildings associated with the delivery location, or one or more dimensions of the one or more buildings associated with the delivery location.

6. The method of claim 1, further comprising:
generating a request to fulfill the order based at least in part on the predicted difference between the arrival time and the delivery time for the delivery location, wherein the request comprises one or more of: an additional service fee and the information describing the set of attributes associated with the delivery location; and
sending the request to fulfill the order to a picker client device associated with a picker associated with the online concierge system.

7. The method of claim 1, further comprising:
generating a prompt for the user to perform an action based at least in part on the predicted difference between the arrival time and the delivery time for the delivery location; and
sending the prompt to the client device responsive to receiving a notification that a picker servicing the order has arrived at the delivery location.

8. The method of claim 1, wherein receiving the information describing the set of attributes associated with the delivery location comprises:
sending a survey associated with the delivery location to one or more of: a customer client device associated with a customer of the online concierge system and a picker client device associated with a picker associated with the online concierge system; and receiving a response to the survey associated with the delivery location, wherein the response to the survey identifies one or more of the set of attributes associated with the delivery location.

9. The method of claim 1, wherein the information describing the set of attributes associated with the delivery location is included in one or more of: customer data provided by the user, order data associated with one or more previous orders placed with the online concierge system, or one or more messages associated with one or more previous orders placed with the online concierge system, wherein the one or more messages were sent between a customer client device and a picker client device.

10. A computer program product comprising a non-transitory computer readable storage medium having instructions encoded thereon that, when executed by a processor, cause the processor to:
receive, from a client device associated with a user of an online concierge system, order data associated with an order placed with the online concierge system, wherein the order data describes a delivery location for the order;
receive information describing a set of attributes associated with the delivery location;
access a machine learning model trained to predict a difference between an arrival time and a delivery time for the delivery location, wherein the machine learning model is trained by:
receiving a plurality of attributes associated with a plurality of delivery locations, wherein the plurality of delivery locations is associated with a plurality of orders,
receiving, for each order of the plurality of orders, a label indicating the difference between the arrival time and the delivery time, and
training the machine learning model based at least in part on the plurality of attributes associated with the plurality of delivery locations and the label for each order of the plurality of orders;
apply, by a time difference prediction module executed by a computer processor, the machine learning model to the set of attributes associated with the delivery location to predict the difference between the arrival time and the delivery time for the delivery location;
determine an actual difference between the arrival time and the delivery time for the order;
in response to a difference between the predicted difference and actual difference being at least a threshold difference, send a prompt for attributes associated with the delivery location for display to the client device; and
train the machine learning model on attributes associated with the delivery location received from the client device in response to the prompt and a label indicating the actual difference between the arrival time and delivery time for the order.

11. The computer program product of claim 10, wherein the set of attributes associated with the delivery location comprises one or more of: a number of steps associated with the delivery location, a number of elevators associated with the delivery location, a number of units associated with the delivery location, a number of floors included in a building associated with the delivery location, a floor number associated with the delivery location, one or more dimensions of the building associated with the delivery location, a gate associated with the delivery location, a call box associated with the delivery location, a security desk associated with the delivery location, or an access code associated with the delivery location.

12. The computer program product of claim 10, wherein the information describing the set of attributes associated with the delivery location is received from one or more of: a customer client device associated with a customer of the online concierge system, a picker client device associated with a picker associated with the online concierge system, or a third-party system.

13. The computer program product of claim 10, wherein the non-transitory computer readable storage medium further has instructions encoded thereon that, when executed by the processor, cause the processor to:
   access an additional machine learning model trained to predict a likelihood that an attribute is associated with the delivery location, wherein the additional machine learning model is trained by:
      receiving information describing a plurality of features associated with an additional plurality of delivery locations,
      receiving, for each additional delivery location of the plurality of additional delivery locations, an additional label indicating whether the attribute is associated with a corresponding additional delivery location, and
      training the additional machine learning model based at least in part on the plurality of features associated with the additional plurality of delivery locations and the additional label for each additional delivery location of the plurality of additional delivery locations;
   apply the additional machine learning model to a set of features associated with the delivery location to predict the likelihood that the attribute is associated with the delivery location; and
   determine one or more attributes of the set of attributes associated with the delivery location based at least in part on the predicted likelihood that the attribute is associated with the delivery location.

14. The computer program product of claim 13, wherein the set of features associated with the delivery location comprises one or more of: an address associated with the delivery location, a floorplan associated with the delivery location, one or more parking spots associated with the delivery location, a geographical location associated with the delivery location, one or more buildings associated with the delivery location, or one or more dimensions of the one or more buildings associated with the delivery location.

15. The computer program product of claim 10, wherein the non-transitory computer readable storage medium further has instructions encoded thereon that, when executed by the processor, cause the processor to:
   generate a request to fulfill the order based at least in part on the predicted difference between the arrival time and the delivery time for the delivery location, wherein the request comprises one or more of: an additional service fee and the information describing the set of attributes associated with the delivery location; and
   send the request to fulfill the order to a picker client device associated with a picker associated with the online concierge system.

16. The computer program product of claim 10, wherein the non-transitory computer readable storage medium further has instructions encoded thereon that, when executed by the processor, cause the processor to:
   generate a prompt for the user to perform an action based at least in part on the predicted difference between the arrival time and the delivery time for the delivery location; and
   send the prompt to the client device responsive to receiving a notification that a picker servicing the order has arrived at the delivery location.

17. The computer program product of claim 10, wherein receive the information describing the set of attributes associated with the delivery location comprises:
   send a survey associated with the delivery location to one or more of: a customer client device associated with a customer of the online concierge system and a picker client device associated with a picker associated with the online concierge system; and
   receive a response to the survey associated with the delivery location, wherein the response to the survey identifies one or more of the set of attributes associated with the delivery location.

18. The computer program product of claim 10, wherein the information describing the set of attributes associated with the delivery location is included in one or more of: customer data provided by the user, order data associated with one or more previous orders placed with the online concierge system, or one or more messages associated with one or more previous orders placed with the online concierge system, wherein the one or more messages were sent between a customer client device and a picker client device.

19. A computer system comprising:
   a processor; and
   a non-transitory computer readable storage medium storing instructions that, when executed by the processor, perform actions comprising:
      receiving, from a client device associated with a user of an online concierge system, order data associated with an order placed with the online concierge system, wherein the order data describes a delivery location for the order;
      receiving information describing a set of attributes associated with the delivery location;
      accessing a machine learning model trained to predict a difference between an arrival time and a delivery time for the delivery location, wherein the machine learning model is trained by:
         receiving a plurality of attributes associated with a plurality of delivery locations, wherein the plurality of delivery locations is associated with a plurality of orders,
         receiving, for each order of the plurality of orders, a label indicating the difference between the arrival time and the delivery time, and
         training the machine learning model based at least in part on the plurality of attributes associated with the plurality of delivery locations and the label for each order of the plurality of orders;
      applying, by a time difference prediction module executed by a computer processor, the machine learning model to the set of attributes associated with the delivery location to predict the difference between the arrival time and the delivery time for the delivery location;
      determining an actual difference between the arrival time and the delivery time for the order;
      in response to a difference between the predicted difference and actual difference being at least a threshold difference, sending a prompt for attributes associated with the delivery location for display to the client device; and training the machine learning model on attributes associated with the delivery location received from the client device in response to the prompt and a label indicating the actual difference between the arrival time and delivery time for the order.

\* \* \* \* \*